Patented June 15, 1943

2,321,620

UNITED STATES PATENT OFFICE 2,321,620

PHENOLIC COMPOUNDS

Burt Carlton Pratt, Wilmington, Del., assignor to E. I. du Pont de Nemours & Company, Wilmington, Del., a corporation of Delaware No Drawing. Application October 10, 1940, Serial No. 360,678

9 Claims. (Cl. 260—619)

This invention relates to long chain polymethylene diphenols and their preparation.

It is known that alkyl phenols, such as tertiary butyl phenol, octyl phenol, amyl phenol, etc., can be prepared by condensing the appropriate unsaturated hydrocarbon or alkyl halide with phenol in the presence of catalysts. These alkyl phenols are generally solids or viscous liquids, possessing relatively low boiling points. Higher boiling alkyl substituted phenols can be prepared by introducing several alkyl groups into the phenol nucleus. However, in most cases the highly alkylated phenols thus prepared lose much of their phenolic properties. High boiling phenols with good phenolic properties can be prepared by condensing ketones with phenol. The resulting diphenylol compounds are usually high melting crystalline compounds, however, and are not suitable for many applications. High boiling liquid phenols, possessing phenolic solvent power similar to that of the simple phenols are highly desirable for many purposes, and their preparation is, therefore, of considerable importance to the art.

This invention has as an object the preparation of new and useful phenolic compounds. A further object is the preparation of new compounds which possess high phenolic activity and which are relatively high-boiling, water-insoluble liquids of excellent solvent power for many materials. A still further object is the preparation of new di-(hydroxyaryl)alkanes. Other objects will appear hereinafter.

The new phenolic compounds of this invention are di-(hydroxyaryl)alkanes in which two hydroxyaryl groups are connected by a bivalent acyclic saturated hydrocarbon radical having a chain length of at least ten carbon atoms. The terms "aryl" and "arylene" in the claims denote aromatic hydrocarbon nuclei.

Although the known reaction of phenol in the presence of a dehydrating agent or catalyst with polymethylene diols containing from three to six carbon atoms in the chain usually results in ring closure, I have found that the above defined phenols having the desirable properties previously pointed out are obtained by reacting, in the presence of a catalyst or dehydrating agent, one molecule equivalent of a saturated aliphatic diol containing not fewer than ten carbon atoms in a continuous chain between the hydroxyl groups, with at least two molecular equivalents of a monohydric mononuclear phenol in which at least one of the positions para or ortho to the phenolic hydroxyl group is unoccupied.

The preferred condensing agents are catalysts such as boron trifluoride or hydrogen fluoride and dehydrating agents such as zinc chloride or sulfuric acid. Reactions involving zinc chloride are usually carried out by heating a molecular equivalent of the diol with four to eight molecular equivalents of a monohydric phenol at 150–200° C. in the presence of two molecular equivalents of zinc chloride for six to twelve hours. In a preferred process using boron trifluoride, four mols of phenol and one mol of a polymethylene diol are heated at 100–170° C. for one to twelve hours in the presence of 0.01 to 1.0 mol of boron trifluoride. With hydrogen fluoride condensation, it is preferred to employ 20 mols of hydrogen fluoride and four mols of phenol for each mol of the polymethylene diol and temperatures from 0 to 50° C. The crude product in each case can be purified by a series of water washes or by distillation under reduced pressure. Various other catalysts, including aluminum chloride, phosphoric acid, magnesium chloride, and Fuller's earth, can also be used.

The nature of the product can be altered to a considerable extent by varying the ratio of reactants. In the presence of stoichiometric quantities of reagents, it is possible to prepare more or less polymeric polyphenolic derivatives. In the presence of an excess of phenol, the di-(hydroxyaryl)alkane becomes substantially the sole product with only small amounts of polymeric impurities. The product in such a case may be purified by a series of washes or by a steam distillation of the lower boiling materials. For many uses, however, the mixture is better than the purified material.

My invention is further illustrated by the following examples in which the parts are by weight.

*Example I*

A mixture of 3300 parts of recrystallized commercial 1,12-octadecanediol, 8000 parts of crystalline phenol, and 3150 parts of dry granulated zinc chloride is heated with stirring in an enamel-lined kettle for nine hours at 160° C. in an atmosphere of nitrogen. The reaction mixture is cooled to 80° C. and washed seven times with twice its volume of water. Last traces of phenol are removed by steam distillation, which is continued until the distillate no longer yields a characteristic phenol test with dilute ferric chloride solution. Excess water is now separated and the product taken up in an equal volume of methanol. The solution is filtered and methanol and water removed by heating under reduced pressure.

Four thousand one hundred fifty parts of product as an amber viscous liquid remains which is sufficiently pure for many purposes. This represents a 79.2 per cent yield based on the 1,12-octadecanediol. Distillation of 4080 parts of the product under reduced pressure shows that 3030 parts (mainly di-(hydroxyphenyl)octadecane) distills from 210 to 265° C./1 mm. and that 1050 parts represents higher boiling material.

Example II

A mixture of 174 parts of 1,10-decamethyleneglycol, 360 parts of crystalline phenol, and 275 parts of anhydrous granulated zinc chloride is stirred at 175° C. for seven hours. The reaction mixture is cooled and decanted from the zinc chloride sludge, and diluted with an equal volume of benzene. The benzene solution is washed three times with equal volumes of water, once with an equal volume of 5 per cent sodium bicarbonate solution, and finally twice with equal volumes of water. The benzene layer is dried over magnesium sulfate. On distillation of 423.2 parts of the benzene-free reaction mixture under reduced pressure, 174 parts of phenol is recovered. Sixty-six and five-tenths parts of a fraction distilling from 124 to 206° C./1 mm. and 105.7 parts of a cut which is mainly 1,10-di-(hydroxyphenyl)decane, B. P. 206–235° C./1 mm. are obtained.

Example III

Four hundred parts of anhydrous hydrogen fluoride (cooled to 5° C.) is added to a copper vessel, equipped with a tight cover, mechanical stirrer, thermometer well, and a port for charging the reactants. A molten mixture of 188 parts of phenol and 143 parts of recrystallized commercial 1,12-octadecanediol is added (with stirring) at such a rate that the temperature remains in the range 15–20° C. Upon completion of the addition of phenol and 1,12-octadecanediol (about 0.5 hour), the reaction mixture is allowed to warm up to room temperature (25–30° C.) and then stirred for an additional six hours. The fuming solution is then poured onto about 1000 parts of ice, 300 parts of benzene is added, the mixture thoroughly agitated, and the aqueous and organic layers allowed to settle. The benzene solution is washed seven times with 200 parts of fresh water. Ten parts of sodium bicarbonate is added to the fourth wash to render the mixture completely neutral. A fraction of unchanged phenol (104.6 parts) is recovered by "topping" the mixture to a pot temperature of 200° C./2 mm., leaving 176.3 parts (80.5% yield) of a viscous, amber liquid. A portion (101 parts) of this distilled under reduced pressure yields 10.4 parts of foreshot distilling lower than 205° C./0.5 mm. and 82.9 parts of material mainly 1,12-di-(hydroxyphenyl)octadecane distilling 205–297° C./0.5 mm., leaving only 6.6 parts of nondistillable residue.

Example IV

A mixture of 188 parts of phenol and 143 parts of recrystallized commercial 1,12-octadecanediol is charged into a flask and heated to 130° C. with stirring. Boron trifluoride is then slowly added in the form of 11.5 parts of a 60 per cent solution in methanol. The mixture is kept at 130–135° C. with stirring for a total of six hours. The mixture is cooled to 80° C. and agitated at this temperature with 200 cc. of water. The aqueous layer is discarded and the oily fraction successively washed with a total of eight portions of water (200 parts each). The washed product is finally topped up to 200° C./1 mm. Thirty-seven and five-tenths parts of unreacted phenol and 173.2 parts (79.1% yield) of a colorless, viscous liquid are obtained. A portion (101 parts) distilled under reduced pressure yields 12.1 parts of foreshot distilling lower than 205° C./0.5 mm., 69.7 parts of material mainly 1,12-di-(hydroxyphenyl)octadecane distilling 205–282° C./0.5 mm. and 19.2 parts of nondistillable residue.

Example V

A mixture of 143 parts of recrystallized 1,12-octadecanediol, 244 parts of xylenol, and 137 parts of zinc chloride is heated at 160–165° C. with stirring for a total of six hours. The reaction mixture is diluted with 200 parts of benzene and washed several times with water and once with a 5 per cent solution of sodium bicarbonate. A fraction of unchanged xylenol (145.4 parts) is recovered by topping at a pot temperature up to 200° C./2 mm. Two hundred seventeen and two tenths parts of a dark brown viscous material representing a yield of 87.9 per cent is obtained. A portion (101 parts) is distilled under reduced pressure and yields 7.5 parts of foreshot distilling lower than 202° C./0.5 mm., 69.2 parts of material mainly di-(hydroxyxylyl)-octadecane distilling 202–292° C./0.5 mm., and 24.1 parts of nondistillable residue.

The new phenolic compounds of this invention are of the general formula

in which P is a mononuclear arylene radical whose free valences stem from ring carbon, and R is a saturated bivalent acyclic hydrocarbon radical having a chain length of at least ten and not more than 14 carbon atoms and having a total carbon content of not more than 34 carbon atoms.

The preferred compounds of this invention may be defined by the formula

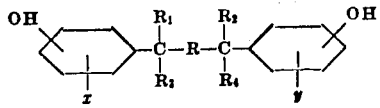

in which R is a saturated bivalent acyclic hydrocarbon radical having a chain length of at least eight and not more than twelve carbon atoms, $R_1$, $R_2$, $R_3$, and $R_4$ are hydrogen or alkyl radicals containing one to ten carbon atoms and totalling not more than twenty carbon atoms, and $x$ and $y$ are hydrogen atoms or alkyl radicals containing from one to eight carbon atoms. The maximum number of carbon atoms in the saturated bivalent acyclic hydrocarbon radical connecting the aromatic group is 34.

More specifically the di(hydroxyaryl)alkanes obtainable in accordance with this invention include a large number of valuable compounds among which are 1,10-di(hydroxyphenyl)octadecane, 1,11-di(hydroxyphenyl)octadecane, 2,11-di(hydroxyphenyl)octadecane, 2,12-di(hydroxyphenyl)octadecane, 2,12-di(hydroxyphenyl)tridecane, 1,13-di(hydroxyphenyl)tridecane, 2,12-di(hydroxyphenyl)docosane, 2,15-di(hydroxyphenyl)hexadecane, 1,10-di(ethylhydroxyphenyl)octadecane, 2,12-di(amylhydroxyphenyl)octadecane, 2,11-di(hydroxytolyl)octadecane, 1,11-di(hydroxytolyl)octadecane, 2,12-di(amylhydroxyphenyl)tridecane, 1,10-di(butylhydroxyphenyl)octadecane.

The long chain di(hydroxyaryl)alkanes of this invention can be prepared by reactions other than those between monohydric phenols and diols. The appropriate dihalide can be reacted with a phenol in the presence of aluminum chloride to yield di(hydroxyphenyl)alkanes. Certain monohydric phenols carrying unsaturated alkyl constituents will dimerize in the presence of a suitable catalyst, and hydrogenation of these dimers yields di(hydroxyphenyl)alkanes. Another reaction which is suitable involves the rearrangement of the phenolic ester of a dibasic acid in the presence of a catalyst (e. g., aluminum chloride) to yield a diketodi(hydroxyphenyl)alkane. The ketone groups can be reduced directly to a methylene group or to an alcohol and thence to a methylene group. Reaction of a phenol with the appropriate diene or the appropriate unsaturated alcohol will also yield the compounds of this invention.

The present phenolic compounds are useful as insecticides, fungicides, and pesticides. Their good oil solubility is important in pharmaceutical and in other uses. These di(hydroxyaryl)-alkanes are compatible with methacrylate resins, ethyl cellulose, polyvinyl acetate, urea-formaldehyde, urea-formaldehyde isobutanol resins, and polyvinyl formal and butyral resins, and are hence useful as plasticizers for these resins in plastic and other applications.

As many apparently widely different embodiments of this invention may be made without departing from the spirit and scope thereof, it is to be understood that I do not limit myself to the specific embodiments thereof except as defined in the appended claims.

I claim:

1. A di(hydroxyaryl)alkane in which two mononuclear, monohydroxyaryl groups are connected by a bivalent acyclic saturated hydrocarbon radical having a chain length of at least ten and not more than 14 carbon atoms between the monohydroxyaryl groups, and having not more than 34 carbon atoms.

2. A di(hydroxyphenyl)alkane in which two monohydroxyphenyl groups are connected by a bivalent acyclic saturated hydrocarbon radical having a chain length of at least ten and not more than 14 carbon atoms between the monohydroxyphenyl groups, and having not more than 34 carbon atoms.

3. A di(hydroxyaryl)alkane of the general formula

HO.P—R—P.OH in which P is a mononuclear arylene radical whose free valences stem from ring carbon, and R is a saturated bivalent acyclic hydrocarbon radical having a chain length of at least ten and not more than 14 carbon atoms between the mononuclear arylene radicals, and having not more than 34 carbon atoms.

4. A di(hydroxyaryl)alkane of the general formula

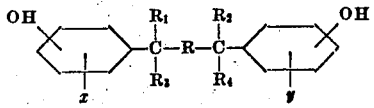

in which R is a saturated bivalent acyclic hydrocarbon radical having a chain length of at least eight and not more than 12 carbon atoms, $R_1$, $R_2$, $R_3$, and $R_4$ are substituents selected from the class consisting of hydrogen and alkyl radicals containing one to ten carbon atoms and totalling not more than twenty carbon atoms, and $x$ and $y$ are substituents selected from the class consisting of hydrogen atoms and alkyl radicals containing from one to eight carbon atoms.

5. A di(hydroxyphenyl)octadecane having a chain of at least ten carbons between the hydroxyphenyl groups.

6. A process for making di(hydroxyaryl)-alkanes in which the alkane group has a chain of at least ten and not more than 14 carbon atoms and has a maximum of 34 carbon atoms separating the hydroxyaryl groups, said process comprising reacting in the presence of a catalyst one molecular equivalent of an aliphatic diol containing not fewer than ten carbon atoms in a continuous chain between the hydroxyl groups, with at least two molecular equivalents of a monohydric mononuclear phenol in which at least one of the positions selected from the group consisting of the positions para and ortho to the phenolic hydroxyl group is unoccupied.

7. 1,12-di(hydroxyphenyl)octadecane.

8. 1,10-di(hydroxyphenyl)decane.

9. 1,12-di(hydroxyxylyl)octadecane.

BURT CARLTON PRATT.